United States Patent
Park et al.

(10) Patent No.: US 9,634,492 B2
(45) Date of Patent: Apr. 25, 2017

(54) POWER GENERATION METHOD AND SYSTEM OF POWER GENERATOR

(71) Applicant: KOREA ELECTRONICS TECHNOLOGY INSTITUTE, Seongnam-si, Gyeonggi-do (KR)

(72) Inventors: Joon Sung Park, Seoul (KR); Jin Hong Kim, Suwon-si (KR); Jun Hyuk Choi, Seoul (KR); In Soung Jung, Seoul (KR)

(73) Assignee: KOREA ELECTRONICS TECHNOLOGY INSTITUTE, Seongnam-si, Gyeonggi-Do (KR)

( * ) Notice: Subject to any disclaimer, the term of this patent is extended or adjusted under 35 U.S.C. 154(b) by 554 days.

(21) Appl. No.: 14/276,267

(22) Filed: May 13, 2014

(65) Prior Publication Data

US 2015/0270715 A1    Sep. 24, 2015

(30) Foreign Application Priority Data

Mar. 18, 2014    (KR) .................. 10-2014-0031803

(51) Int. Cl.
*H02J 4/00*     (2006.01)
*H02J 3/38*     (2006.01)
*H02J 3/46*     (2006.01)

(52) U.S. Cl.
CPC .............. *H02J 4/00* (2013.01); *H02J 3/386* (2013.01); *H02J 3/46* (2013.01); *Y02E 10/763* (2013.01); *Y10T 307/718* (2015.04)

(58) Field of Classification Search
CPC ........................................ H02J 4/00
USPC .......................................... 307/84
See application file for complete search history.

(56) References Cited

U.S. PATENT DOCUMENTS

2006/0066111 A1* 3/2006 Suryanarayanan ... F03D 7/0272
                                                                 290/44
2008/0303289 A1* 12/2008 Holliday ................. F02D 29/00
                                                                 290/4 R

FOREIGN PATENT DOCUMENTS

JP    2002233193 A    8/2002
JP    2011010505 A    1/2011
JP    2013013178 A    1/2013

OTHER PUBLICATIONS

Korean Office Action for corresponding Korean Application No. 10-2014-0031803 dated Jun. 3, 2015.
Korean Notice of Allowance for application No. 10-2014-0031803 dated Oct. 22, 2015.

* cited by examiner

*Primary Examiner* — Joseph Chang
(74) *Attorney, Agent, or Firm* — Hauptman Ham, LLP

(57) ABSTRACT

Provided are a power generation method and system of a power generator that can allow an output power of the power generator to be constant and cope with a case in which the velocity of a power generation source changes very quickly at a low lost. The power generation method includes determining a reference total power intended to be generated by a plurality of power generators, calculating a current command value through the reference total power and an instantaneous velocity sensed by each of the plurality of power generators, and regulating an output current of the power generator using the calculated current command value such that a total power output by the plurality of power generators is approximate to the reference total power.

8 Claims, 6 Drawing Sheets

POWER GENERATION METHOD AND SYSTEM OF POWER GENERATOR

CROSS-REFERENCE TO RELATED APPLICATION

This application claims priority to and the benefit of Korean Patent Application No. 10-2014-0031803 filed in the Korean Intellectual Property Office on Mar. 18, 2014, the entire contents of which are incorporated herein by reference.

TECHNICAL FIELD

The present invention relates to a power generation system of a power generator, and more particularly, to a power generation method and system of a power generator that intend to perform control such that power output from a plurality of power generators is constant.

BACKGROUND

Recently, interest in power generators using alternative energy is increasing because of the exhaustion of conventional fossil fuels and serious environment pollution.

Examples of the power generators using alternative energy include a nuclear power generator using nuclear energy, a solar power generator using solar energy, a wind power generator using wind energy, and a tidal power generator using tidal energy of sea water.

Among these power generators, the wind power generator and the tidal power generator convert a rotational force generated by winds and waves as power generation sources into power, respectively, and use a synchronous machine, specifically a permanent magnet synchronous machine.

In general, a plurality of wind power generators and tidal power generator are used to generate power. Since strength of winds and waves, which are power generation sources, are not constant, velocities of the power generation sources change continuously.

When the velocities of the power generation sources change continuously, powers generated by power generators have different amplitudes and phases, thus causing ripples.

As such, since an output power generated without consideration of each power generation amount has a ripple, the output power connected to an existing power network may make the power network unstable.

Even when the power generation amount is the same because each power generator generates power at the same velocity, an output power may have a ripple due to change in phase.

In a related art, in order to overcome these limitations, an energy storage device is used at an output end of a power generator to output a constant power.

However, the power generator using the energy storage device has a limitation in that the energy storage device leads to increase in a product cost.

In addition, in the related art, a method of changing a blade angle of a power generator according to a velocity of a power generation sources is used.

That is, the method of changing a blade angle of a power generator may include changing the blade angle to rotate the power generator slower when the velocity is high and faster when the velocity is low, thereby reducing the ripple.

However, the method of changing a blade angle of a power generator has a limitation in that its reliability is low because it is difficult to cope with a case in which the velocity changes quickly.

SUMMARY

The present invention is directed to providing a power generation method and system of a power generator that can output a constant power from a power generator at a low cost.

The present invention is also directed to providing a power generation method and system of a power generator that can cope with a case in which the velocity of the power generation source changes quickly.

One aspect of the present invention provides a power generation method including determining a reference total power as a reference value, calculating a current command value using the reference total power and an instantaneous velocity sensed by each of a plurality of power generators, and regulating an output current of each power generator using the calculated current command value such that an output power is approximate to the reference total power.

The reference total power may be a total power based on a root mean square (rms) velocity during a certain period of time.

The current command value may be determined using a following equation:

$$C = \frac{P_{total}}{v_1^2 + v_2^2 + \ldots + v_n^2},$$

where C denotes a current command value, $v_1$ to $v_n$ denote instantaneous velocities, and $P_{total}$ denotes a reference total power.

The current command value may be a proportional constant of a force or toque and a velocity of the power generator.

The regulating of the output current may include controlling a current using the current command value as shown in a following equation:

$$i = \frac{C}{K_f} v \text{ or } i = \frac{C}{K_t} v,$$

where i denotes an output current, C denotes a current command value, $K_f$ denotes a proportional constant of a force and a current, $K_t$ denotes a proportional constant of a toque and a current, and v is a velocity of each power generation source.

Another aspect of the present invention provides a power generation system including a plurality of power generators each configured to have a sensing unit for sensing an instantaneous velocity and a current, a controller configured to calculate a current command value using the instantaneous velocity sensed by the sensing unit and generate a control signal for regulating an output current of each power generator using the calculated current command value such that an output power is approximate to the reference total power, and a current regulator installed in an output end of each power generator and configured to receive the control signal from the controller and control the output current output by the power generator.

The power generator may be a wind power generator, a wave power generator, or a tidal power generator.

The controller may include a calculation unit configured to calculate the current command value, and a current signal generation unit configured to generate a control signal for regulating the output current of each power generator using the current command value calculated by the calculation unit.

According to the power generation method and system of the power generator, it is possible to cope with a case in which the velocity of the power generation source changes quickly by calculating a current command value based on a reference total power and an instantaneous velocity sensed by each power generator and controlling an output current of the power generator such that a total power output from the power generator is approximate to the reference total power.

It is also possible to output a constant power without a separate device, thereby reducing a production cost of the power generator, by calculating a current command value based on a reference total power and an instantaneous velocity sensed by each power generator and controlling an output current of the power generator such that a total power output from the power generator is approximate to the reference total power.

DETAILED DESCRIPTION

In the following description, detailed descriptions of well-known functions or constructions will be omitted since they would obscure the invention in unnecessary detail.

It should be understood that the terms used in the specification and the appended claims should not be construed as limited to general and dictionary meanings, but interpreted based on the meanings and concepts corresponding to technical aspects of the present invention on the basis of the principle that the inventor is allowed to define terms appropriately for the best explanation. Therefore, the description proposed herein is just a preferable example for the purpose of illustrations only, not intended to limit the scope of the invention, so it should be understood that other equivalents and modifications could be made thereto without departing from the spirit and scope of the invention.

Hereinafter, a power generation system 100 of a power generator according to an embodiment of the present invention will be described with reference to drawings.

Figure 1:
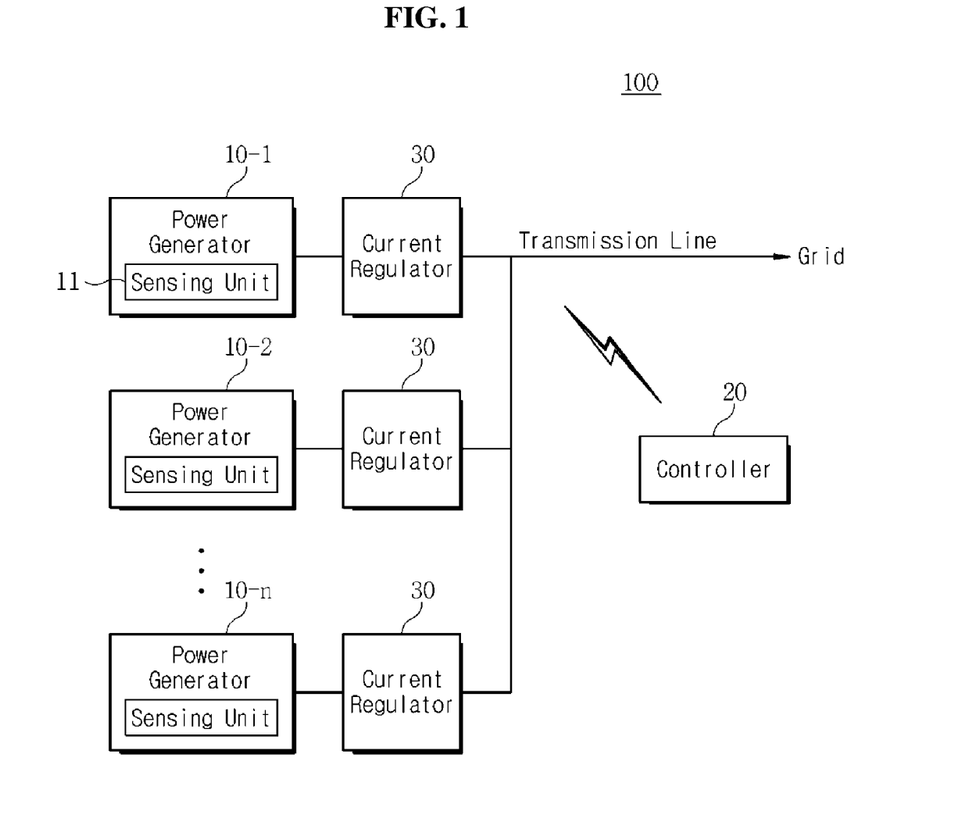
FIG. 1 is a block diagram illustrating a power generation system of a power generator according to an embodiment of the present invention.
Figure 2:
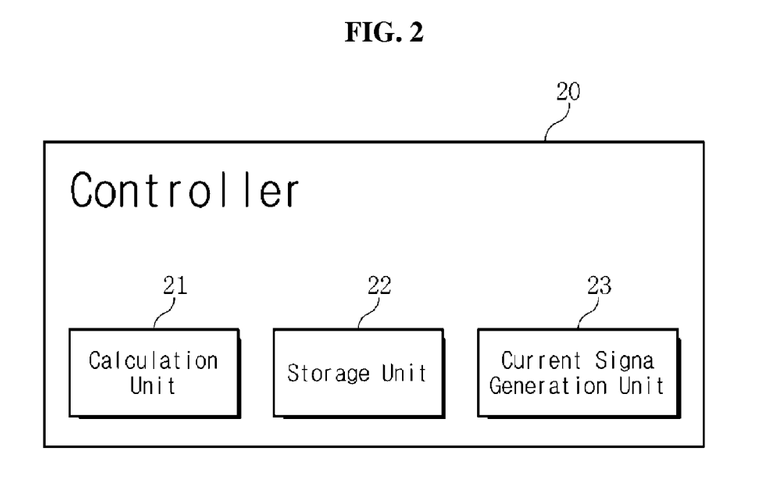
FIG. 2 is a block diagram illustrating a controller in a power generation system of a power generator according to an embodiment of the present invention.

FIG. 1 is a block diagram showing a power generation system of a power generator according to an embodiment of the present invention, and FIG. 2 is a block diagram showing a controller in a power generation system of a power generator according to an embodiment of the present invention.

Referring to FIGS. 1 and 2, the power generation system 100 according to an embodiment of the present invention may perform control such that a total power of a plurality of power generators 10-1 to 10-$n$ is constant to transmit the constant power to a power grid.

The power generation system 100 may include a controller 20 and a current regulator 30 in addition to the plurality of power generators 10-1 to 10-$n$.

Examples of the plurality of power generators 10-1 to 10-$n$ include wind power generators, wave power generators, and tidal power generators. Hereinafter, the wind power generators are described as an example.

Each of the plurality of power generators 10-1 to 10-$n$ may include a sensing unit 11 for sensing a velocity and an electric current.

Velocities of power generation sources (e.g., in this case, wind velocities) may be different due to geographical features in a wind power generation complex and effects of adjacent electrical power generators.

Thus, the sensing unit 11 may be installed in each of the plurality of electrical power generators 10-1 to 10-$n$ to sense a velocity, which varies with time, of the power generation source, that is, a wind velocity and sense an output current, which varies with velocity, of each of the plurality of electrical power generators 10-1 to 10-$n$.

Here, the velocity of each of the power generation sources may be a velocity of a wind power turbine of each of the plurality of electrical power generators 10-1 to 10-$n$.

In addition, the sensing unit 11 may deliver values of the sensed velocity and current to the below-described controller 20 over a wireless communication. However, the present invention is not limited thereto. The sensing unit 11 may deliver values of the sensed velocity and current to the controller 20 through a wired connection.

The wireless communication includes a long-range communication, such as a wireless broadband (Wibro) a wireless fidelity (WiFi), a worldwide interoperability for microwave access (WiMax), and a short-range communication, such as Zigbee, Bluetooth, etc. if the number of power generators 10-1 to 10-$n$ is small.

The controller 20 may generate a control signal for allowing a power output from each of the power generators 10-1 to 10-$n$ to be constant on the basis of the velocity and electric current values delivered from the sensing unit 11.

The controller 20 may include a calculation unit 21, a storage unit 22, and a current signal generation unit 23.

The calculation unit 21 may calculate a current command value using the velocity and electric current values delivered from the sensing unit 11.

The current command value may be calculated using Equation (1) below:

$$C = \frac{P_{total}}{v_1^2 + v_2^2 + \ldots + v_n^2} \quad (1)$$

where C denotes a current command value, $v_1$ to $v_n$ denote instantaneous velocities of power generation sources, and $P_{total}$ denotes a reference total power.

As shown in Equation (1), the current command value may be calculated using the instantaneous velocity and the reference total power to be output.

Equation (1) may be induced from Equations (2), (3), (4), and (5) below.

$$F=Cv \text{ or } T=Cw \qquad (2)$$

where F or T denotes a force or toque, c denotes a current command value (proportional constant), and v or w denotes a velocity.

That is, in Equation (2), the force or toque generated by each of the power generators 10-1 to 10-n is proportional to the velocity of the power generation source.

$$P=Fv \text{ or } P=Tw \qquad (3)$$

where P denotes an output power, F or T denotes a force or toque, and v or w denotes a velocity.

That is, in Equation (3), the output power of the power generator is proportional to the force or toque generated by each of the power generators 10-1 to 10-n.

Accordingly, Equation (4) may be induced from Equations (2) and (3).

$$P=Cv^2 \text{ or } P=Cw^2 \qquad (4)$$

where P denotes an output power, C denotes a proportional constant (current command value), and v or w denotes a velocity.

That is, in Equation (4), the output power is proportional to a square of the velocity of the power generation source.

Thus a total power output from each of the power generators 10-1 to 10-n may be expressed as Equation (5).

$$P_{total}=Cv^2_1+Cv^2_2+\ldots+Cv^2_n \qquad (5)$$

where $P_{total}$ denotes a total power (reference total power), C denotes a proportional constant (current command value), and v denotes a velocity.

Accordingly, Equation (1), which is used to calculate a current command value, may be induced through Equation (5).

Here, the total power of Equation (5) may be the reference total power of Equation (1).

The reference total power may be determined arbitrarily by an administrator, but is not limited thereto. The reference total power may be determined by a root mean square (rms) velocity during a certain period of time.

That is, the reference total power may be determined in consideration of an average total power capable of being output by the power generators 10-1 to 10-n.

The storage unit 22 may store a program for operating the power generation system 100 of the power generator and data obtained by operating the program. That is, the storage unit 22 may store an operating system of operating the electrical power generation system of the power generators 10-1 to 10-n.

In particular, the storage unit 22 may store and deliver a calculation equation used for calculation of the calculation unit 21 and result values obtained by the calculation to the current signal generation unit 23.

The current signal generation unit 23 may generate a control signal for controlling an output current of each of the power generators 10-1 to 10-n using a current command value calculated by the calculation unit 21.

Since the current command value is proportional to the output current as shown in Equation (6), the current signal generation unit 23 may generate a control signal for a value of a current according to the current command value in consideration of the velocity of each of the power generators 10-1 to 10-n and deliver the control signal to the current regulator 30.

That is, the current signal generation unit 23 may regulate outputs generated by the plurality of power generators 10-1 to 10-n to the reference total power to perform control such that a total power value may become the reference total power.

$$i = \frac{C}{K_f}v \text{ or } i = \frac{C}{K_t}v \qquad (6)$$

where i denotes an output current, C denotes a current command value, v denotes a velocity of a power generation source, and $K_f$ or $K_t$ denotes a proportional constant of a force or toque and a current.

Accordingly, Equation (6) may be induced from Equations (7) and (2).

$$F=K_f i \text{ or } T=K_t i \qquad (7)$$

where F or T denotes a force or torque, $K_f$ or $K_t$ denotes a proportional constant of a force or torque and a current, and i denotes an output current.

That is, since the force or torque is proportional to a current and a velocity of a power generation source, Equation (6) may be induced.

The current regulator 30 may be installed at an output end of each of the plurality of power generators 10-1 to 10-n to receive the control signal from the current signal generation unit 23 of the controller 20 and control a current output by each of the power generators 10-1 to 10-n at every moment according to the control signal.

Hereinafter, a change in the total power with respect to the output current will be described by applying the power generation system 100 of a power generator according to an embodiment of the present invention.

Figure 3:
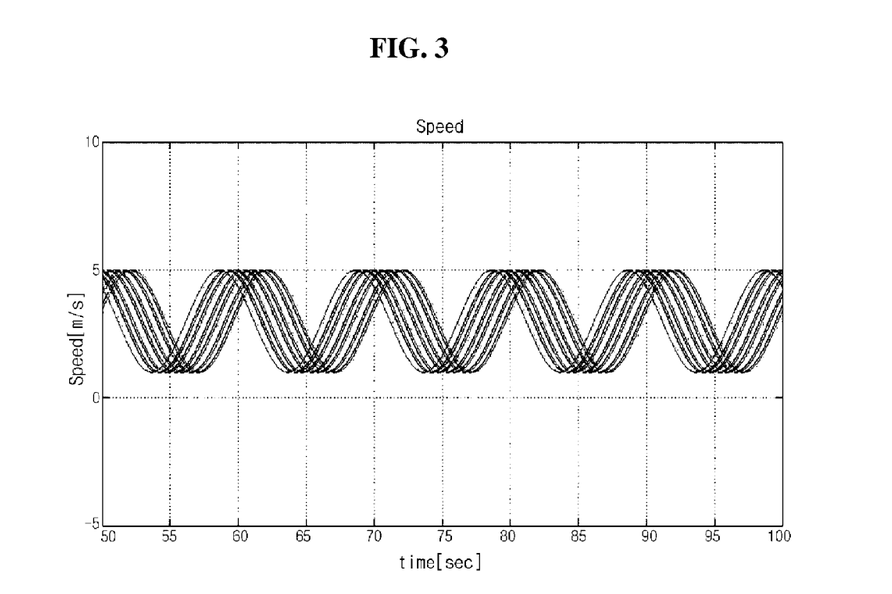
FIG. 3 is a graph illustrating velocities of power generation sources input to a plurality of power generators.
Figure 4:
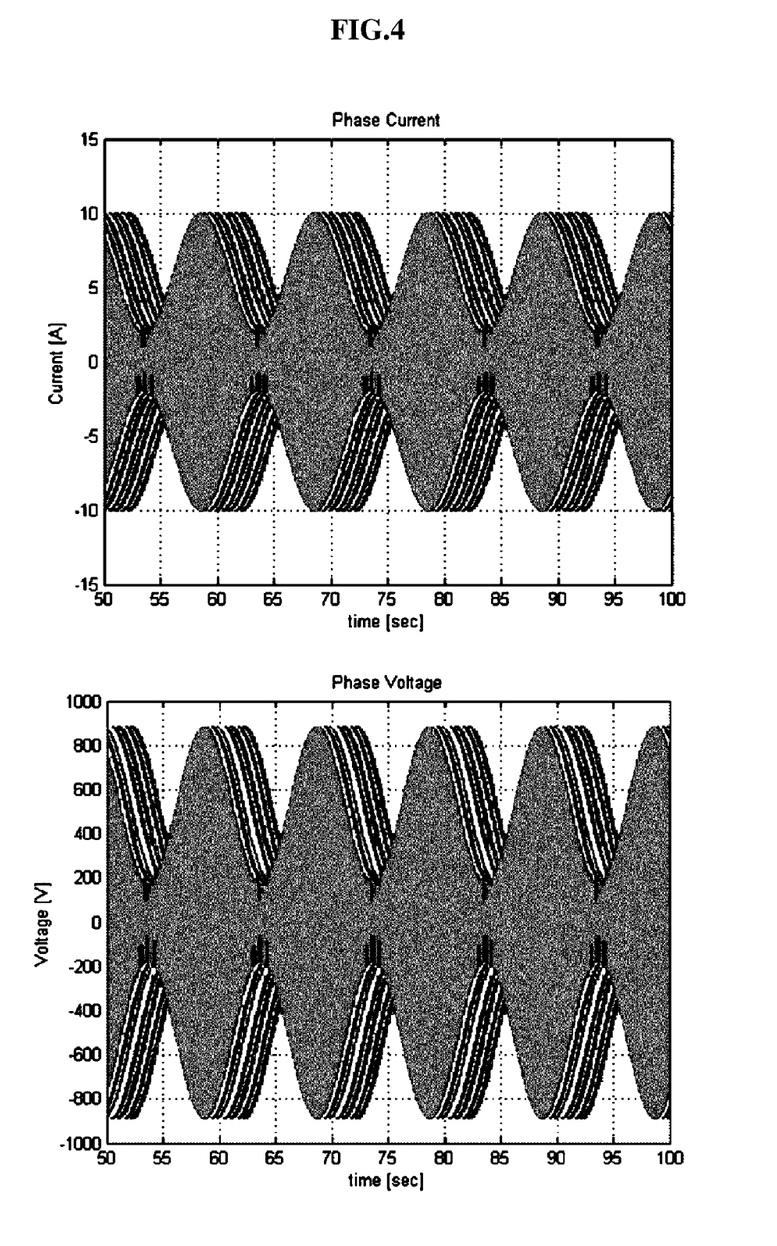
FIG. 4 is a graph showing output current and voltage when the power generation sources are input at the velocities shown in FIG. 3.
Figure 5:
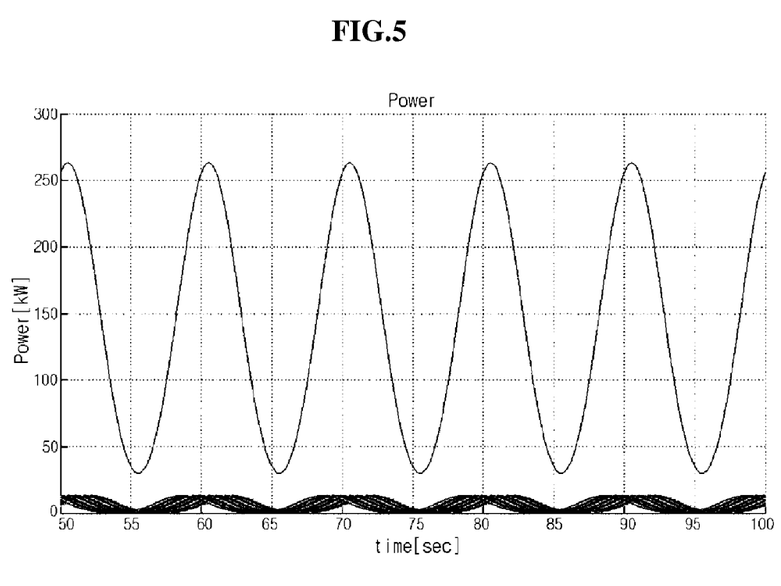
FIG. 5 is a graph showing a total power output by the currents and voltages output as shown in FIG. 4.
Figure 6:
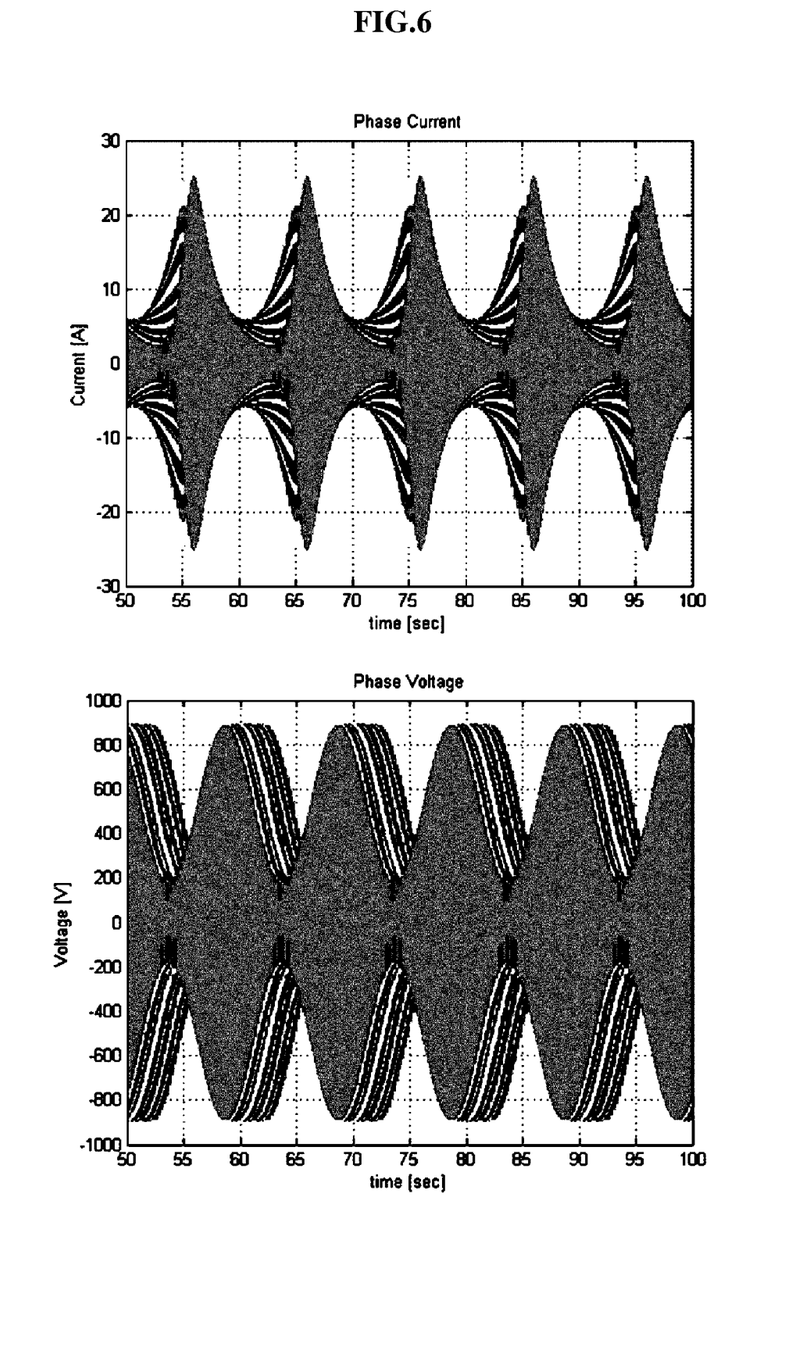
FIG. 6 is a graph of currents and voltages regulated by applying a power generation system of a power generator according to an embodiment of the present invention when the power generation sources are input at the velocities as shown in FIG. 3.
Figure 7:
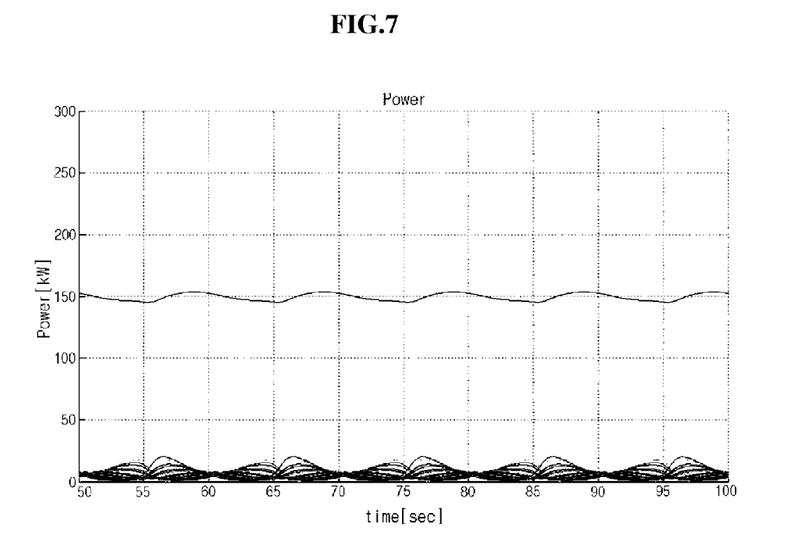
FIG. 7 is a graph showing a total power output by the currents and voltages output as shown in FIG. 6.

FIG. 3 is a graph illustrating velocities of power generation sources input to a plurality of power generators, FIG. 4 is a graph showing output current and voltage when the power generation sources are input at the velocities shown in FIG. 3, FIG. 5 is a graph showing a total power output by the currents and voltages output as shown in FIG. 4, FIG. 6 is a graph of currents and voltages regulated by applying a power generation system of a power generator according to an embodiment of the present invention when the power generation sources are input at the velocities as shown in FIG. 3, and FIG. 7 is a graph showing a total power output by the currents and voltages output as shown in FIG. 6.

Referring to FIGS. 3 to 7, if the velocities of the power generation sources as shown in FIG. 3 are not constant with time, the current and voltage output by the power generators 10-1 to 10-n have a ripple due to a phase difference.

Thus the total power to be output has a ripple twice greater than a velocity of the power generation source according to FIG. 5.

When an output current is regulated by applying the power generation system 100 of the power generator according to an embodiment of the present invention, a constant power may be output irrespective of the velocity of the power generation source as shown in FIG. 7.

Accordingly, the power generation system 100 of the power generator according to an embodiment of the present invention may correspond to a case in which a velocity of the power generation source changes very quickly, by estimating an output total power, calculating a current command value according to the velocities of the power generation source using the total power, and regulating a current of each of the power generators 10-1 to 10-*n*.

In addition, the power generation system 100 of the power generator according to an embodiment of the present invention may not use a separate device in order to output a constant power by estimating an output total power, calculating a current command value according to the velocities of the power generation source using the total power, and regulating a current of each of the power generators 10-1 to 10-*n*, thereby reducing the production cost of each of the power generators 10-1 to 10-*n*.

Figure 8:
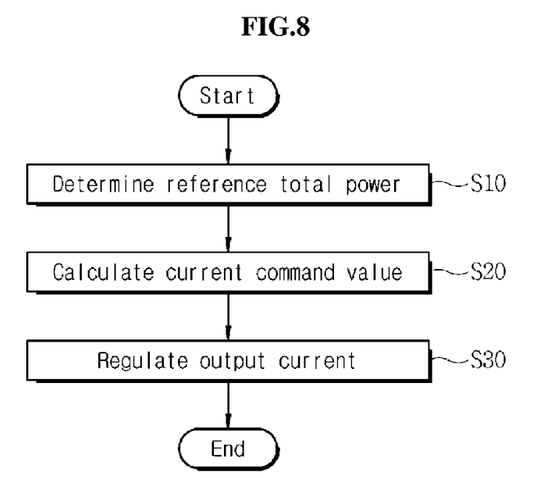
FIG. 8 is a flowchart showing a power generation method of a power generator according to an embodiment of the present invention.

FIG. 8 is a flowchart showing a power generation method of a power generator according to an embodiment of the present invention.

The power generation method of the power generators 10-1 to 10-*n* according to an embodiment of the present invention is a power generation method using the power generation system 100 of the power generator. For convenience, repetitive description thereof may be omitted.

Referring to FIGS. 1 to 8, in step S10, the method includes determining a reference total power as a reference value.

That is, in step S10, the reference total power is a total power that is intended to be output by the plurality of power generators 10-1 to 10-*n*, and may be applied to Equation (1).

Next, in step S20, the method includes calculating a current command value through the reference total power and an instantaneous velocity sensed by each of the power generators 10-1 to 10-*n*.

That is, in step S20, the current command value may be calculated by applying the reference total power and the instantaneous velocity sensed by each of the power generators 10-1 to 10-*n* to Equation (1).

Next, in step S30, the method includes regulating an output current of each of the power generators 10-1 to 10-*n* such that an output power is approximate to the reference total power using the calculated current command value.

That is, in step S30, the output current may be regulated such that the total power is constant by regulating the output current according to the current command value changing according to the velocity sensed by each of the power generators 10-1 to 10-*n* at every moment.

The above embodiments are merely exemplary but not limitative examples. It will be apparent to those skilled in the art that various modifications can be made to the above-described exemplary embodiments of the present invention without departing from the spirit or scope of the invention.

What is claimed is:

1. A power generation method comprising:
determining a reference total power intended to be generated by a plurality of power generators;
calculating a current command value using the reference total power and an instantaneous velocity sensed by each of the plurality of power generators; and
regulating an output current of the power generator using the calculated current command value such that a total power output by the plurality of power generators is approximate to the reference total power.

2. The power generation method of claim 1, wherein the reference total power is a total power based on a root mean square (rms) velocity during a certain period of time.

3. The power generation method of claim 2, wherein the current command value is determined using a following equation:

$$C = \frac{P_{total}}{v_1^2 + v_2^2 + \ldots + v_n^2}$$

where C denotes a current command value, $v_1$ to $v_n$ denote instantaneous velocities, and $P_{total}$ denotes a reference total power.

4. The power generation method of claim 3, wherein the current command value is a proportional constant of a force or toque and a velocity of the power generator.

5. The power generation method of claim 4, wherein the regulating of the output current comprises controlling a current using the current command value as shown in a following equation:

$$i = \frac{C}{K_f} v \text{ or } i = \frac{C}{K_f} w$$

where i denotes an output current, C denotes a current command value, $K_f$ denotes a proportional constant of a force and a current, $K_t$ denotes a proportional constant of a toque and a current, and v denotes a velocity of each power generation source.

6. A power generation system comprising:
a plurality of power generators each configured to have a sensing unit for sensing an instantaneous velocity and an output current of a power generation source;
a controller configured to determine a reference total power intended to be generated by the plurality of power generators, to calculate a current command value using the instantaneous velocity sensed by the sensing unit, and to generate a control signal for regulating an output current of each power generator using the calculated current command value such that an output power is approximate to the reference total power; and
a current regulator installed in an output end of each power generator and configured to receive the control signal from the controller and control the output current output by the power generator.

7. The power generation system of claim 6, wherein the power generator is a wind power generator, a wave power generator, or a tidal power generator.

8. The power generation system of claim 6, the controller comprises:
a calculation unit configured to calculate the current command value; and
a current signal generation unit configured to generate a control signal for regulating the output current of each power generator using the current command value calculated by the calculation unit.

* * * * *